(12) United States Patent
Xiao et al.

(10) Patent No.: US 8,316,083 B2
(45) Date of Patent: Nov. 20, 2012

(54) SYSTEM AND METHOD FOR CLIENT INTEROPERABILITY

(75) Inventors: Dongbo Xiao, Edison, NJ (US); Thomas E. Barnes, Whitehouse Station, NJ (US); Rajesh Patel, Burlington, MA (US); Salvatore Anthony Gambino, Ringoes, NJ (US); Kathiravan Sengodan, Alpharetta, GA (US); Shean-Guang Chang, Morris Plains, NJ (US); Shauagxi Pei, Groton, MA (US); Hal Strausberg, Waban, MA (US)

(73) Assignee: Oracle International Corporation, Redwood Shores, CA (US)

( * ) Notice: Subject to any disclaimer, the term of this patent is extended or adjusted under 35 U.S.C. 154(b) by 268 days.

(21) Appl. No.: 12/400,633

(22) Filed: Mar. 9, 2009

(65) Prior Publication Data
US 2009/0259715 A1    Oct. 15, 2009

Related U.S. Application Data

(60) Provisional application No. 61/034,932, filed on Mar. 7, 2008.

(51) Int. Cl.
*G06F 15/16* (2006.01)
*G06F 15/173* (2006.01)
*G06F 3/00* (2006.01)

(52) U.S. Cl. ........ 709/203; 709/219; 709/223; 709/224; 709/227; 709/230; 719/328

(58) Field of Classification Search .................. 709/203, 709/219, 223, 224, 227, 230; 719/328
See application file for complete search history.

(56) References Cited

U.S. PATENT DOCUMENTS

| | | | |
|---|---|---|---|
| 7,418,708 B2 * | 8/2008 | Currie et al. ................. 719/313 |
| 2002/0198908 A1 * | 12/2002 | Hartel ............................ 707/513 |
| 2003/0009571 A1 * | 1/2003 | Bavadekar .................... 709/230 |
| 2005/0005158 A1 * | 1/2005 | Alaluf ............................ 713/200 |
| 2006/0168122 A1 * | 7/2006 | Acharya et al. ............... 709/219 |
| 2008/0046899 A1 * | 2/2008 | Shawver et al. .............. 719/330 |
| 2008/0209506 A1 * | 8/2008 | Ghai et al. ........................ 726/1 |

* cited by examiner

*Primary Examiner* — Ranodhi Serrao
*Assistant Examiner* — Farrukh Hussain
(74) *Attorney, Agent, or Firm* — Fliesler Meyer LLP

(57) ABSTRACT

Disclosed herein is a system and method for client interoperability. In one embodiment, a method for client interoperability comprises establishing a network connection between a client and a proxy. The client requests a connection factory from the proxy. The proxy then obtains the connection factory from an application server using a Java Naming and Directory Interface (JNDI). Using the connection factory, a connection to a connection host from the client is created. When the client sends a message, the proxy receives the message and routes the message to a destination server. Similarly, when the client receives a message, the proxy receives the message from a destination server and passes the message to the client. The client can be specifically configured to extend JMS operability to a desired language. In one embodiment the client is a .NET client.

20 Claims, 4 Drawing Sheets

SYSTEM AND METHOD FOR CLIENT INTEROPERABILITY

CLAIM OF PRIORITY

This application claims benefit to and incorporates by reference in its entirety the following U.S. Provisional Patent Application:

U.S. Provisional Patent Application No. 61/034,932 entitled "System and Method for Client Interoperability," by Dongbo Xiao et al., filed Mar. 7, 2008.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application server environments, and in particular to a system and method for client interoperability.

BACKGROUND

The Java Message Service (JMS) is an enterprise messaging system that enables applications to asynchronously communicate with one another through the exchange of messages. A message is a request, report, and/or event that contains information needed to coordinate communication between different applications. JMS enables Java applications that share a messaging system to exchange messages and simplifies application development by providing an interface for creating, sending, and receiving messages. JMS accepts messages from producer applications and delivers messages to consumer applications.

A JMS queue defines a point-to-point destination type for a JMS server. A message delivered to a queue is distributed to a single consumer. A JMS topic identifies a publish/subscribe destination type for a JMS server. Topics are used for asynchronous peer communications. A message delivered to a topic is distributed to all consumers that are subscribed to that topic.

JMS clients are based on the Java Programming Language and Specification. This allows them to make use of Java features such as JDBC, JavaBeans, Java Transaction API (JTA), and other Java enterprise application services. Languages and software components other than Java, such as Ruby and the .NET Framework, have gained in popularity and there is demand for a way to integrate JMS support into applications written in languages other than Java. For example, the .NET framework shares much in common with Java. The .NET framework includes a virtual machine, the Common Language Runtime (CLR), and uses an object oriented language, C#. There are two problems with which an integration solution has to address. First, there is a language interoperability problem; for example, Java and .NET use different byte order formats. Second, the .NET Client applications need access to the JMS messaging system.

SUMMARY

Disclosed herein is a system and method for client interoperability. In one embodiment, a method for client interoperability comprises establishing a network connection between a client and a proxy. The client requests a connection factory from the proxy, which obtains the connection factory from an application server using a Java Naming and Directory Interface (JNDI). Using the connection factory, a connection to a connection host from the client is created. When the client sends a message, the proxy receives the message and routes the message to a destination server through the connection host. Similarly, when the client receives a message, the proxy receives the message from a destination server and passes the message to the client. One benefit of this approach is that it provides performance improvements over other integration methods, for example, by requiring fewer additional network calls for similar operations. The client can be specifically configured to extend JMS operability to a desired language. In one embodiment the client is a .NET client.

DETAILED DESCRIPTION

As shown herein, in several embodiments interoperability can be achieved between .NET applications and the Java Message Service (JMS) using a proxy and a client specifically configured for .NET. As one of ordinary skill in the relevant art would recognize, this .NET client is just one example of a client which can be used to broaden the operability of JMS. In other embodiments, additional clients can be developed which are specifically configured for other languages and software components. Such additional clients can achieve interoperability between applications written in another language, e.g. Ruby, and JMS in much the same way as the .NET client.

There are several components in a JMS architecture. For example, in one embodiment, the WebLogic JMS architecture, by Oracle Corporation of Redwood City, Calif. includes: JMS servers and connection hosts; JMS modules which contain configuration resources such as queue and topic destinations, distributed destinations, and connection factories; a Java Naming and Directory Interface (JNDI) service which provides a lookup facility; and persistent storage for storing persistent message data; and JMS Client environment or simply client JMS applications which can either produce or consume messages using the resources available in the server environment.

Figure 1:
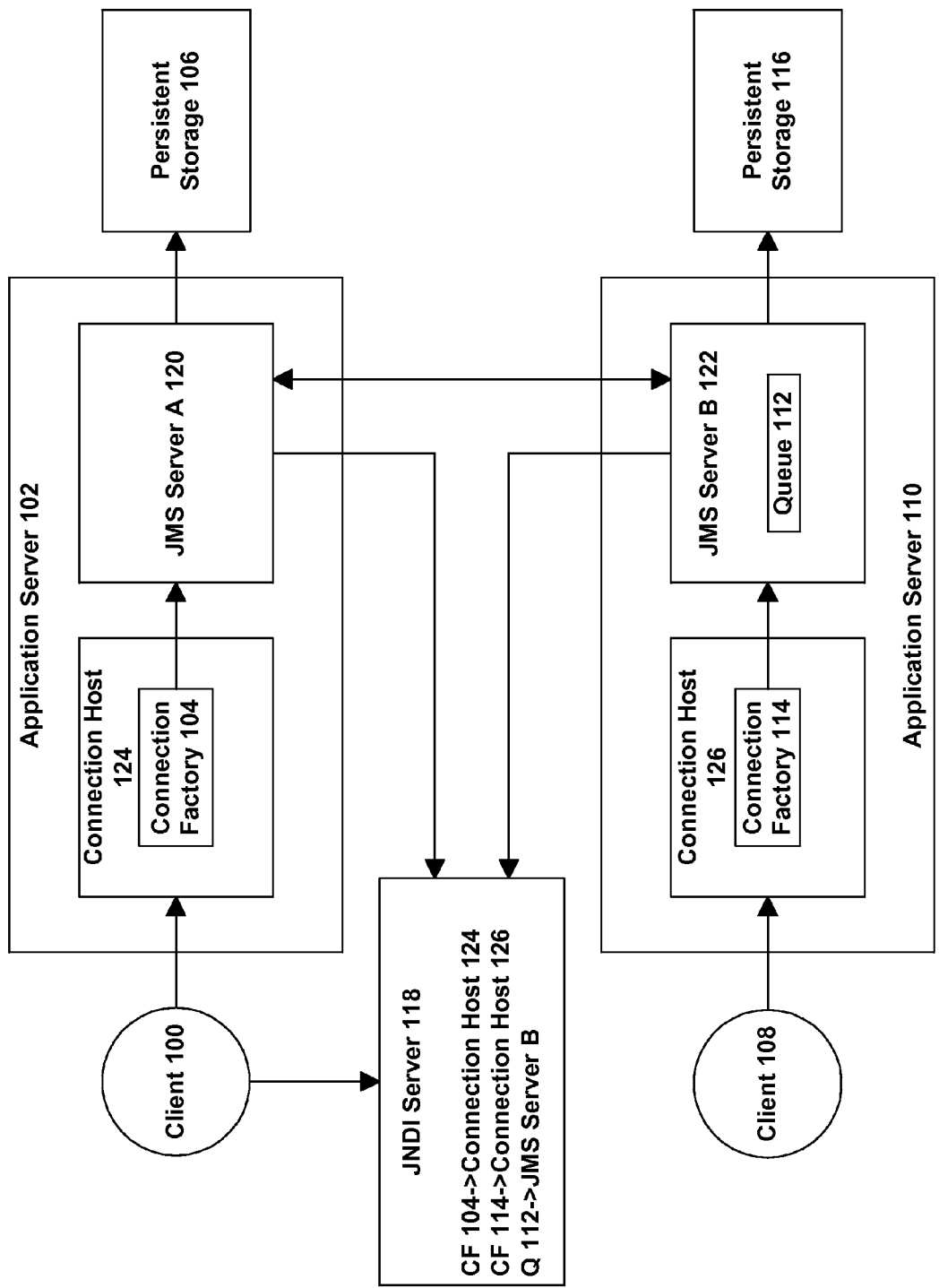
FIG. 1 shows an example JMS architecture.

FIG. 1 shows an example JMS architecture. As shown therein, Application Server 102 includes JMS Server A 120 and Connection Host 124. Connection Host 124 includes Connection Factory 104. Similarly, Application Server 110 includes Connection Host 126 and JMS Server B 122. Connection Host 126 includes Connection Factory 114 and JMS Server B 122 includes Queue 112. Client 100 and Client 108 can communicate with JMS Servers A 120 and B 122 via Connection Factories 104 and 114. Each JMS server is connected to a persistent storage device 106 and 116. The persistent storage device is the JMS server's default store, a user-defined store, or a user-defined Java Database Connectivity (JDBC)-accessible store. A JNDI Server 118 allows the clients to lookup which services are on which server. In FIG.

1, the JNDI indicates that Connection Factory 104 (CF 104) is on Connection Host 124, Connection Factory 114 (CF 114) is on Connection Host 126, and Queue 112 (Q 112) is on JMS server B 122.

In one embodiment, JMS servers act as management containers for JMS queue and topic resources. A JMS server's primary responsibility for its targeted destinations is to maintain information on which persistent store is used for any persistent messages that arrive on the destinations, and to maintain the states of durable subscribers created on the destinations. As a container for targeted destinations, any configuration or run-time changes to a JMS server can affect all of its destinations.

Connection factories are resources that enable JMS clients to create JMS connections. In one embodiment, a connection factory supports concurrent use, enabling multiple threads to access an object simultaneously. A user can configure connection factories to create connections with predefined options to suit the user's application. Connection factories can be used in a cluster and can establish cluster-wide, transparent access to JMS destinations from any application server in the cluster by using connection factories for each server instance or by using one or more connection factories with each connection factory being targeted to one or more server instances in the cluster.

Use of .NET for JMS

Figure 2:
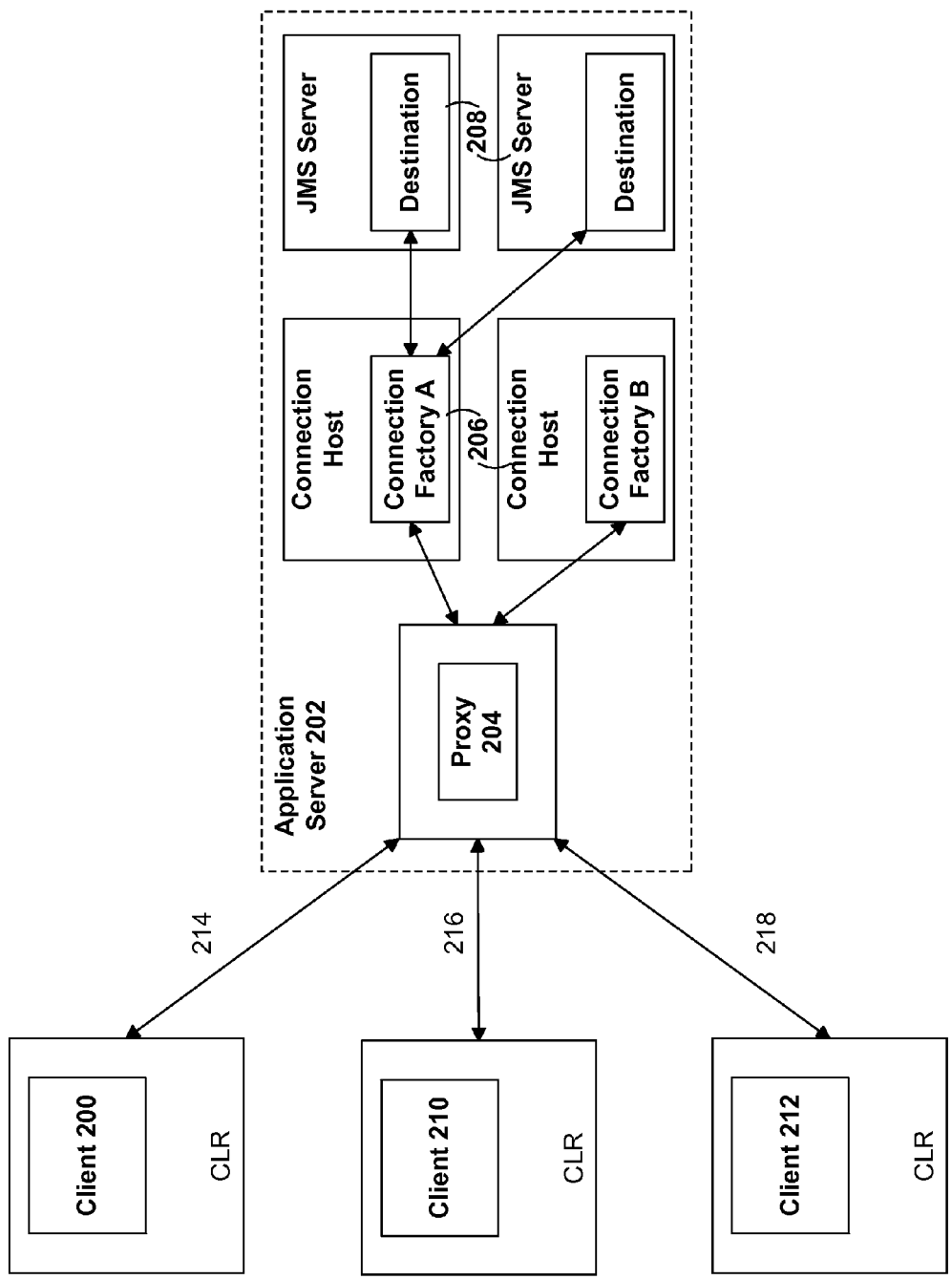
FIG. 2 shows a system for client interoperability in accordance with an embodiment.

FIG. 2 shows a system for client interoperability in accordance with an embodiment. In one embodiment, problems with client interoperability are addressed through a specifically configured client and a proxy. The system of FIG. 2 comprises a plurality of Clients 200, 210, and 212. The clients can be specifically configured to extend JMS operability to a desired language. In one embodiment the clients are .NET clients. Each .NET client runs in a Common Language Runtime (CLR), the .NET equivalent of the Java Virtual Machine. The .NET clients receive application messages, transform the application messages and send the transformed application messages to a Proxy 204. The .NET Clients are coupled through communication media 214, 216, and 218 to the Proxy 204. The proxy receives the transformed application messages and routes operations contained in the transformed application messages to a plurality of servers. A single proxy can serve multiple .NET Clients and is not limited to the three of this example. The proxy and the plurality of servers can be contained in an application server 202. The plurality of servers includes JMS Servers 208 and connection hosts 206.

In one embodiment, the proxy enables the exchange of messages between the plurality of .NET clients and the JMS Destinations on the JMS servers. In accordance with an embodiment, the proxy appears to JMS as a normal JMS client. The proxy uses JMS API to route the operations it receives from the .NET client to the JMS server. Services are assigned numbers and indexed in a service index. When the proxy receives an operation from a .NET client attempting to invoke a service, the proxy invokes the service using the service's assigned number. In doing so, the proxy makes the .NET client appear to the JMS server as a Java client.

In one embodiment, .NET applications run on the same application server as the .NET client. In one embodiment, the application objects are the messages sent by the application.

In one embodiment, when the client transforms the application objects it converts the application objects to a lower level representation and then transforms the lower level representation to be compatible with Java. The communication media connecting a plurality of clients with the proxy are capable of transporting the transformed lower level representation of the application objects. Additionally, the proxy routes the operations contained in the transformed application objects to the plurality of servers using the JMS application programming interface (API) and invokes services on the plurality of servers using a numbered service index. In one embodiment, the messages are transformed as they are sent.

In one embodiment, a method for client interoperability comprises establishing a network connection between a client and a proxy. The client requests a connection factory from the proxy which obtains the connection factory using a Java Naming and Directory Interface (JNDI). Using the connection factory, a connection to a connection host from the client is created. When the client sends a message, the proxy receives the message and routes the message to a destination server through the connection host. Similarly, when the client receives a message, the proxy receives the message from a server destination and passes the message to the client. The client can be specifically configured to extend JMS operability to a desired language. In one embodiment the client is a .NET client.

Figure 3:
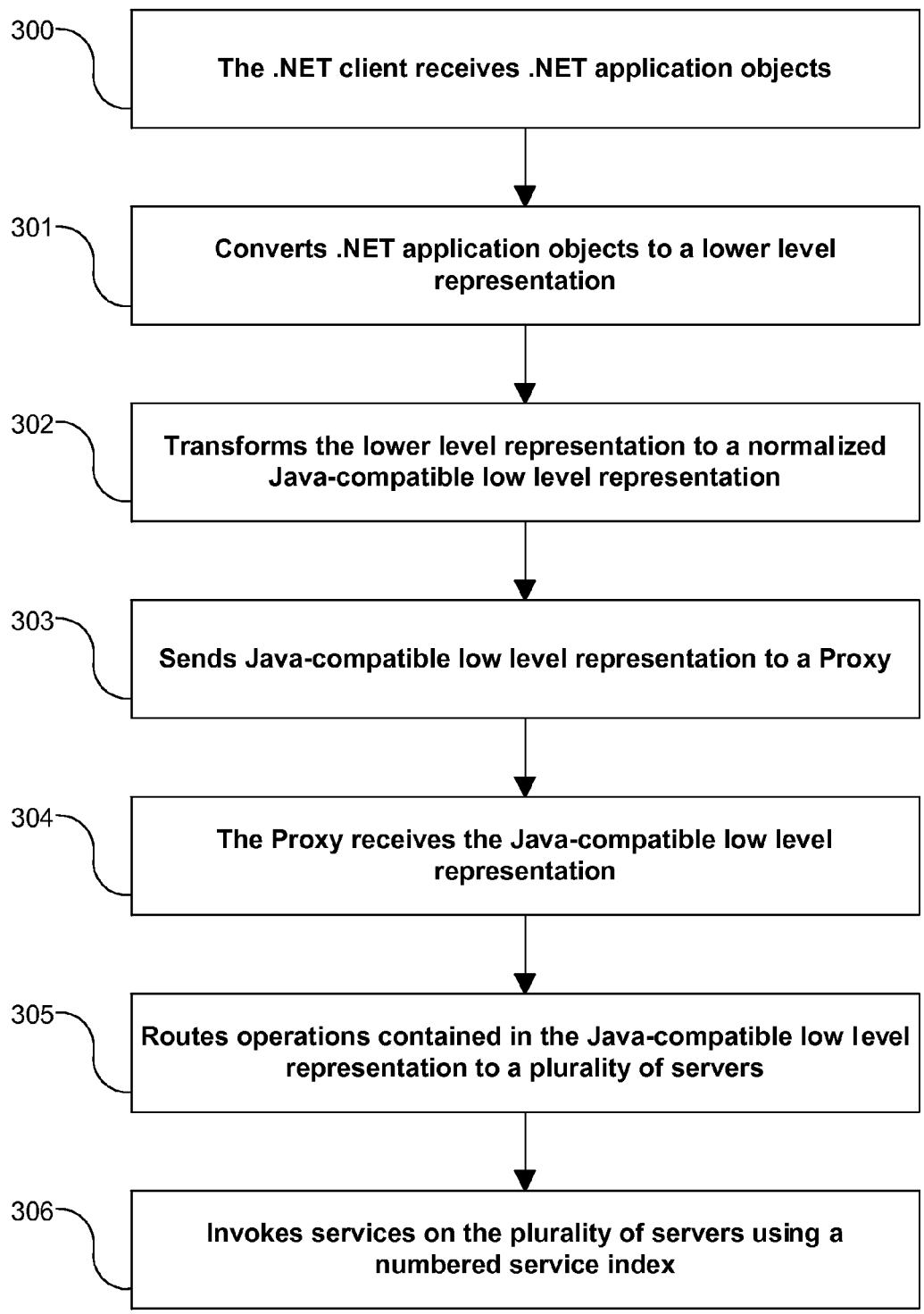
FIG. 3 shows a method for client interoperability in accordance with an embodiment.

FIG. 3 shows a method for client interoperability in accordance with an embodiment. At step 300, a .NET client receives .NET application objects, which, in one embodiment, are messages that are programmatically created using an API supplied to the .NET client. At step 301, the .NET Client converts the .NET application objects to a lower level representation; at step 302 it transforms the lower level representation into a normalized Java-compatible low level representation; and at step 303 it sends the Java-compatible low level representation to a proxy through a communication medium. At step 304, the proxy receives the Java-compatible low level representation and at step 305 it routes operations contained in the Java-compatible low level representation using a JMS API to a plurality of servers. At step 306, the proxy also invokes services on the plurality of servers using a numbered service index.

In one embodiment, traffic to the JMS server is always routed from the .NET client through the proxy to the connection host to the JMS servers. Similarly, in one embodiment, traffic to the .NET Client is always routed from the JMS servers to the connection host and through the proxy to the .NET client.

In accordance with an embodiment, a programmer can create a plurality of .NET applications. The programmer uses a .NET Client to access JMS services. The .NET client converts the .NET applications' objects to a lower level representation. This lower level representation is transformed before it is communicated to a proxy. The transformation can include endian conversion and byte sign conversion. Before data is communicated to or from the proxy, data is converted as needed. For example, Java uses Big Endian format while .NET uses Little Endian format. Similarly, .NET supports both signed and unsigned byte primitive data types, but Java only supports signed bytes. In one embodiment, for interoperability between .NET and Java, the .NET client allows only the use of the signed byte for reading and writing bytes. For unsigned bytes with a value greater than 127, the .NET client converts the unsigned byte to a signed byte before storing the byte. The transformed low level representation is then communicated to a proxy. The proxy receives requests from the .NET client and then uses the JMS API and a numbered index of services to make calls to services corresponding to the .NET client requests.

Figure 4:
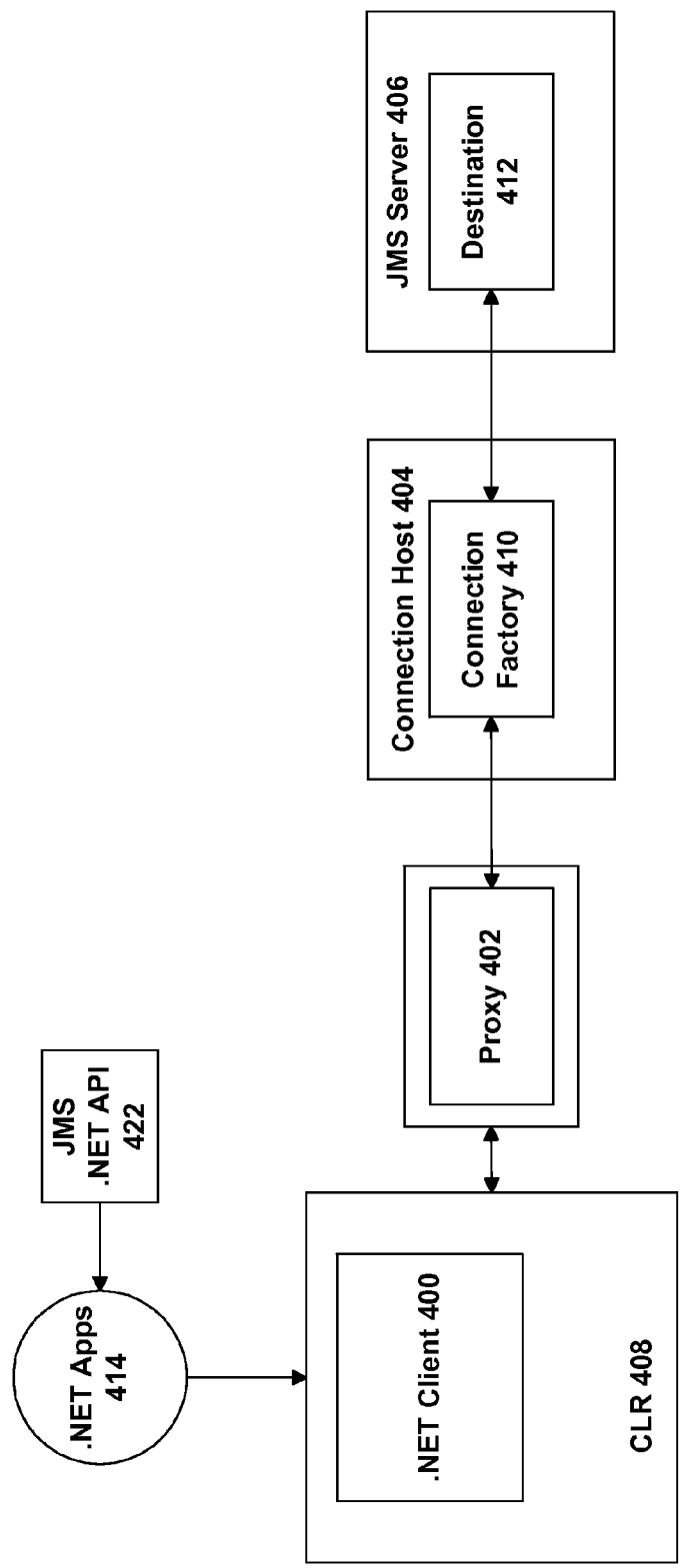
FIG. 4 shows a system for client interoperability in accordance with an embodiment.

FIG. 4 shows a system for client interoperability in accordance with an embodiment. A .NET Client 400, running on a Common Language Runtime (CLR) 408 in the .NET Framework, is connected to a Proxy 402. The .NET applications send messages to other applications and components using JMS through the .NET Client and the Proxy. A programmer writes a .NET application 414 using a JMS .NET API 422. The JMS .NET API is an application programming interface specifically designed to enable a developer to write .NET applications with JMS functionality. When the .NET application 414 sends a message, the message is received by a .NET Client 400. The .NET Client converts the message to a lower level representation and transforms the lower level representation of the message to be compatible with Java. The transformed lower level representation is then sent to the Proxy 402. The Proxy processes the data it receives and routes the data to the appropriate server. Here, the proxy routes messages to Destination 412 on JMS Server 406 through Connection Factory 410 on Connection Host 404. Similarly, when a component or application sends a message to a .NET application, it is sent to the Proxy first, then to the .NET Client where it is converted to be compatible with .NET, and then to the destination .NET application. The system could be modified to include a client specifically configured for another language without modifying additional components to extend interoperability to another application written in another language.

The .NET Client

In one embodiment, the .NET Client is a fully managed .NET runtime library and API. This enables a programmer to create .NET client applications, written in C#, that can access JMS applications and resources.

In accordance with an embodiment, the .NET client enables programmers to create .NET applications according to .NET standards. The .NET applications are converted to a lower level representation which includes bytes, byte arrays, and some primitive types. This lower level representation is transformed to be compatible with Java. The transformed lower level representation is then pushed on a transport protocol and passed to the proxy. In one embodiment, any transport protocol known to the art can be used. In another embodiment, the T3 transport protocol can be used.

In one embodiment, the .NET client mimics the Java-way of retrieving the connection factory and Queue/Topic that are deployed on the application server, which is to look up a ConnectionFactory and Queue/Topic using an InitialContext. In one embodiment, the main properties required for establishing an initial context are a provider URL including at least one host:port pair and security information including a user name and password. The InitialContext includes a lookup method and a close method. In one embodiment, when the provider URL contains a comma separated list of host:port pairs, a round-robin algorithm is used to begin at a random location in the list, and try each entry until one succeeds or all fail.

In one embodiment, the .NET client can support standard JMS message types including: TextMessages, BytesMessages, Map Messages, Object Messages, and Stream Messages. In one embodiment, the producer and consumer of an Object Message must be written in the same language, e.g. if an Object Message is sent by a Java producer and received by a C# consumer, then the user receives a message format error when attempting to access the object.

The .NET client can also support JMS transacted sessions. Transacted sessions provide a standard local transaction capability. Multiple JMS destinations from the same cluster can participate in a transacted session local transaction, but other resources, such as JMS destinations from other clusters, cannot participate.

In one embodiment, the same proxy and client can work with any standard JMS implementations. For example, the .NET client can communicate with multiple JMS vendors using the same API and network configuration.

Use of the Proxy

The proxy can manage multiple clients. In one embodiment, the clients are .NET clients, in another embodiment the clients are specifically configured for another language. In one embodiment, the same proxy can manage multiple clients where each client has been specifically configured to use a different language. In accordance with an embodiment, the proxy appears to JMS as a normal JMS client. The proxy receives the low level representation of the .NET applications from the .NET client. The proxy uses JMS API to route the operations it receives from the .NET client to the JMS server. Services are assigned numbers and indexed in a service index. When the proxy receives an operation from a .NET client attempting to invoke a service, the proxy invokes the service using the service's assigned number. In doing so, the proxy makes the .NET client appear to the JMS server as a Java client.

Exclusive Locking

In one embodiment, the system includes a lock manager. The lock manager is an internal hierarchical structure for handling creation and destruction of related objects robustly, i.e., a way to automatically clean up child objects of parents which need to be destroyed. The lock manager is capable of automatically handling the locking and associated locking/sleeping behavior that is typical in this paradigm. The lock manager runs on the client.

JMS connections contain sessions and sessions contain producers and consumers. Individual locks are needed for connections and sessions. This presents difficulties when one holds a session lock and needs to reconnect, by establishing a new connection, or to close connections. There is a need to be careful of which locks are held and which locks are being waited for, particularly when stopping connections. When a connection is stopped all sessions within a connection must be stopped. Stopping all sessions requires stopping each consumer in each session. Failure to properly manage locks can result in a deadlock. The only remedy for a deadlock is restarting the client. In one embodiment, this problem is addressed by the lock manager by requiring all locks to coordinate with one another.

.NET Client Supported Features

In one embodiment, the .NET Client is extended to support non-standard JMS features. For example, the .NET Client may support:
- distributed destinations;
- imported store-and-forward (SAF) destinations;
- Foreign Destinations;
- Producer Flow Control;
- redelivery limit, redelivery delay, and error destinations via configuration;
- WLDestination.getCreateDestinationArgument;
- WLSession.NO_ACKNOWLEDGE acknowledge mode;
- unit-of-order;
- scheduled messaging; and
- MessagesMaximum pipeline for MessageListeners via connection factory configuration settings.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features can be used in a WebLogic environment using the .NET Framework, other application servers, virtual machines, computing environments, software development systems and languages may use and benefit from the invention. The code examples given are presented for purposes of illustration. It will be evident that the techniques described herein can be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for client interoperability between a non-Java software application and a JMS server, comprising:
   a computer which includes a computer readable medium, processor, and one or more Java Message Service (JMS) servers executing thereon, wherein each JMS server is associated with a connection host and connection factory;
   a plurality of non-Java software applications written using a non-Java JMS API such that the plurality of non-Java software applications can communicate using JMS;
   one or more non-Java clients, each of which is configured to mimic functionality of a Java client, and enable the plurality of non-Java software applications to access the destination services at the one or more JMS servers;
   a proxy associated with the one or more JMS servers, which includes a service index of the destination services and a JMS API, wherein the proxy enables an exchange of messages between the one or more non-Java clients and the destination services, by using the service index of the destination services and the JMS API to route operations between the non-Java clients to the JMS servers;
   wherein when one of the non-Java software applications sends a message, one of the one or more non-Java clients receives, from the non-Java software application, the message including application objects in the programming language other than Java,
      transforms the received application objects into Java-compatible application objects, and
      communicates the Java-compatible application objects to the proxy; and
   wherein when the proxy receives the Java-compatible application objects, the proxy routes operations included in the application objects using its service index and its JMS API to and from the destination services, such that the application objects received from the non-Java software application appear to the JMS server to be originating from a Java client.

2. The system of claim 1 wherein said one of the one or more non-Java clients communicates the Java-compatible application objects to the proxy using a communication medium which is capable of transporting low level representation data which includes bytes, byte arrays and primitive types.

3. The system of claim 1 wherein the plurality of servers include JMS servers and connection host servers.

4. The system of claim 1 wherein the proxy invokes services on the plurality of servers using a numbered service index.

5. The system of claim 1 wherein: said one of the one or more non-Java clients is written in C# and is running in a .NET Framework Common Language Runtime (CLR); and the application objects are .NET application objects.

6. The system of claim 1 wherein said one of the one or more non-Java clients converts the application objects to a low level representation, which includes bytes, byte arrays and primitive types, and transforms the low level representation to be a normalized Java-compatible low level representation.

7. The system of claim 1 wherein said one of the one or more non-Java clients produces messages to destinations.

8. The system of claim 1 wherein said one of the one or more non-Java clients consumes messages from destinations.

9. A method for client interoperability comprising:
   providing a computer which includes a computer readable medium, processor, and one or more Java Message Service (JMS) servers executing thereon, wherein each JMS server is associated with a connection host and connection factory;
   providing a plurality of non-Java software applications written using a non-Java JMS API such that the plurality of non-Java software applications can communicate using JMS;
   providing one or more non-Java clients, each of which is configured to mimic functionality of a Java client, and enable the plurality of non-Java software applications to access the destination services at the one or more JMS servers;
   providing a proxy associated with the one or more JMS servers, which includes a service index of the destination services and a JMS API, wherein the proxy enables an exchange of messages between the one or more non-Java clients and the destination services, by using the service index of the destination services and the JMS API to route operations between the non-Java clients to the JMS servers;
   wherein when one of the non-Java software applications sends a message, one of the one or more non-Java clients receives, from the non-Java software application, the message including application objects in the programming language other than Java at a non-Java client,
      transforms the received application objects into Java-compatible application objects, and
      communicates the Java-compatible application objects to the proxy;
   receiving the Java-compatible application objects at the proxy from the non-Java client; and
   when the proxy receives the Java-compatible application objects, routing, by the proxy using its service index and its JMS API, operations contained in the Java-compatible application objects to and from the destination services such that the application objects received from the non-Java software application appear to the JMS server to be originating from a Java client.

10. The method of claim 9 wherein said one of the one or more non-Java clients communicates the Java-compatible application objects to the proxy using a communication medium which is capable of transporting low level representation data which includes bytes, byte arrays and primitive types.

11. The method of claim 9 wherein the plurality of servers include JMS servers and connection host servers.

12. The method of claim 9 wherein the proxy invokes services on the plurality of servers using a numbered service index.

13. The method of claim 9 wherein: said one of the one or more non-Java clients is a .NET client, written in C#, and running in a .NET Framework Common Language Runtime (CLR); and the application objects are .NET application objects.

14. The method of claim 9 wherein said one of the one or more non-Java clients converts the application objects to a low level representation, which includes bytes, byte arrays and primitive types, and transforms the low level representation to be a normalized Java-compatible low level representation.

15. The method of claim 9 wherein said one of the one or more non-Java clients produces messages to destinations.

16. The method of claim 9 wherein said one of the one or more non-Java clients consumes messages from destinations.

17. A computer program product which is a non-transitory storage medium including instructions thereon that when executed by a computer cause the computer to:
provide a computer which includes a computer readable medium, processor, and one or more Java Message Service (JMS) servers executing thereon, wherein each JMS server is associated with a connection host and connection factory;
provide a plurality of non-Java software applications written using a non-Java JMS API such that the plurality of non-Java software applications can communicate using JMS;
provide one or more non-Java clients, each of which is configured to mimic functionality of a Java client, and enable the plurality of non-Java software applications to access the destination services at the one or more JMS servers;
provide a proxy associated with the one or more JMS servers, which includes a service index of the destination services and a JMS API, wherein the proxy enables an exchange of messages between the one or more non-Java clients and the destination services, by using the service index of the destination services and the JMS API to route operations between the non-Java clients to the JMS servers;
wherein when one of the non-Java software applications sends a message, one of the one or more non-Java clients
receive, from the non-Java software application, the message including application objects in the programming language other than Java at a non-Java client,
transform the received application objects into Java-compatible application objects, and
communicate the Java-compatible application objects to the proxy;
receive the Java-compatible application objects at the proxy from the non-Java client; and
when the proxy receives the Java-compatible application objects, route, by the proxy using its service index and its JMS API, operations contained in the Java-compatible application objects to and from the destination services such that the application objects received from the non-Java software application appear to the JMS server to be originating from a Java client.

18. The computer program product of claim 17 wherein said one of the one or more non-Java clients communicates the Java-compatible application objects to the proxy using a communication medium which is capable of transporting low level representation data which includes bytes, byte arrays and primitive types.

19. The computer program product of claim 17 wherein: said one of the one or more non-Java clients is a .NET client, written in C#, and running in a .NET Framework Common Language Runtime (CLR); and the application objects are .NET application objects.

20. The computer program product of claim 17 wherein said one of the one or more non-Java clients converts the application objects to a low level representation, which includes bytes, byte arrays and primitive types, and transforms the low level representation to be a normalized Java-compatible low level representation.

* * * * *